United States Patent
Lin et al.

(10) Patent No.: US 8,463,570 B2
(45) Date of Patent: Jun. 11, 2013

(54) METHOD FOR TESTING ELECTRONIC DEVICE

(75) Inventors: Yu-Long Lin, Shenzhen (CN); Hua Dong, Shenzhen (CN); Jie-Jun Tan, Shenzhen (CN); Yi-Yong Xie, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 338 days.

(21) Appl. No.: 12/944,750

(22) Filed: Nov. 12, 2010

(65) Prior Publication Data

US 2012/0016617 A1     Jan. 19, 2012

(30) Foreign Application Priority Data

Jul. 14, 2010   (CN) ................... 2010 1 0223749

(51) Int. Cl.
*G06F 19/00*     (2011.01)

(52) U.S. Cl.
USPC ....................................................... 702/108

(58) Field of Classification Search
USPC .................. 702/108, 117, 118, 182–185, 188
See application file for complete search history.

(56) References Cited

U.S. PATENT DOCUMENTS 7,173,538 B2 *   2/2007   Pedraza et al. ................ 340/604

* cited by examiner

*Primary Examiner* — Edward Raymond
(74) *Attorney, Agent, or Firm* — Altis Law Group, Inc.

(57) ABSTRACT

A method for testing an electronic device is implemented with a host computer. The host computer detects a test status of the electronic device. The host computer stores a test order table that indicates the test status and test order corresponding to the test status. The host computer transmits a test order based on the test status and the test order table to the electronic device. The electronic device executes a self-test based on the test order.

12 Claims, 3 Drawing Sheets

METHOD FOR TESTING ELECTRONIC DEVICE

BACKGROUND

1. Technical Field

The present disclosure relates to a method for testing an electronic device.

2. Description of Related Art

Electronic devices are tested during mass production using a host computer in communication with the electronic devices. A test order for the electronic devices is manually launched on the host computer, requiring a requisite level of operator experience. Further, such testing can be time consuming.

DETAILED DESCRIPTION

Figure 1:
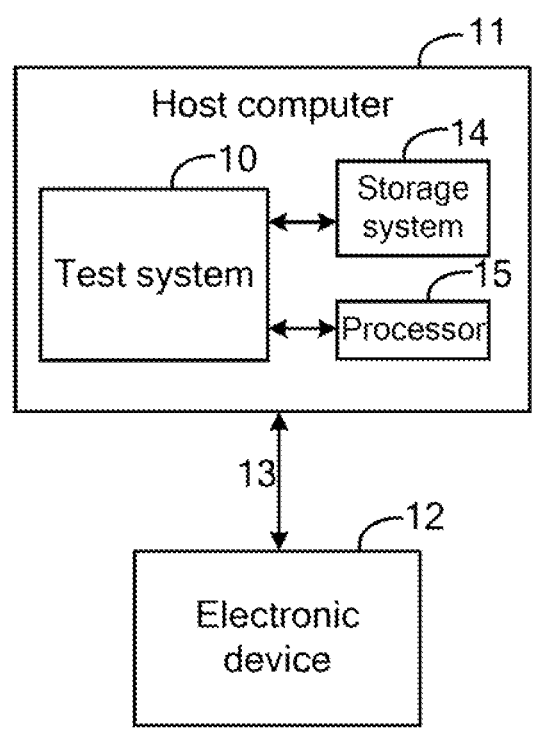
FIG. 1 is a block diagram of a host computer in communication with an electronic device.

FIG. 1 is a block diagram of a host computer 11 in communication with an electronic device 12 through an interface 13. The host computer 11 is capable of testing the electronic device 12, and includes a test system 10, a storage system 14, and a processor 15. The electronic device 12 may be a mobile phone, a handheld computer, or a personal digital assistant (PDA), for example. The interface 13 may be a serial port, such as ethernet, FireWire, or USB, for example.

In general, the word "module" as used herein, refers to logic embodied in hardware or firmware, or to a collection of software instructions, written in a programming language, such as, for example, Java, C, or assembly. One or more software instructions in the unit may be integrated in firmware, such as an EPROM. It will be appreciated that module may comprise connected logic units, such as gates and flip-flops, and may comprise programmable units, such as programmable gate arrays or processors. The unit described herein may be implemented as either software and/or hardware unit and may be stored in any type of computer-readable medium or other computer storage device.

Figure 2:
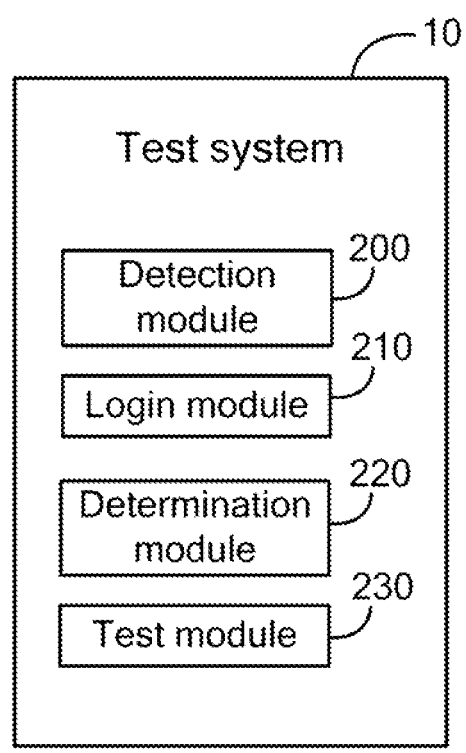
FIG. 2 is a block diagram of one embodiment of a test system on the host computer of FIG. 1, configured to implement a method for testing an electronic device, as disclosed.

FIG. 2 is a block diagram of one embodiment of the test system 10 of the host computer 11 of FIG. 1, configured to implement a method for testing the electronic device 12, as disclosed. The test system 10 includes a detection module 200, a login module 210, a determination module 220, and a test module 230. The modules 200-230 may comprise computerized code in the form of one or more programs that are stored in the storage system 14. The computerized code includes instructions that are executed by the processor 15 to provide functions for the modules 200-230.

The detection module 200 detects whether the electronic device 12 is turned on and detects a test status of the electronic device 12. In the embodiment, the test status includes an initial status that indicates start of a test of the electronic device 12 and an end status that indicates that the test has ended. The login module 210 is operable to automatically log onto the electronic device 12. The determination module 220 determines whether the test status is the end status. The test module 230 is operable to transmit a test order corresponding to the test status of the electronic device 12. The test order may include to test processor of the electronic device 12, to test memory of the electronic device 12, and others, for example.

When the electronic device 12 is turned on, the electronic device 12 transmits a notice operable to notify that the electronic device 12 has been turned on to the host computer 11. As a result of the notice, the detection module 200 confirms the electronic device 12 is turned on based on the notice. The login module 210 logs onto the electronic device 12 using a default username and password stored in the storage system 14. The detection module 200 further transmits a status feedback request to the electronic device 12, and then electronic device 12 feeds the test status back to the host computer 11 in response to the status feedback request.

The storage system 14 further stores a test order table which is a file that indicates the test status and the test order corresponding to the test status. Particularly, when the test status of a test of element A has ended, the test order corresponding to the test status is to test element B. In the embodiment, when the test status to test of the processor of the electronic device 12 has ended, the test order corresponding to the test status is to test the memory of the electronic device 12. The determination module 220 confirms the test order based on the test status and the test order table. The test module 230 transmits the test order to the electronic device 12. The electronic device 12 executes a self-test based on the test order.

Figure 3:
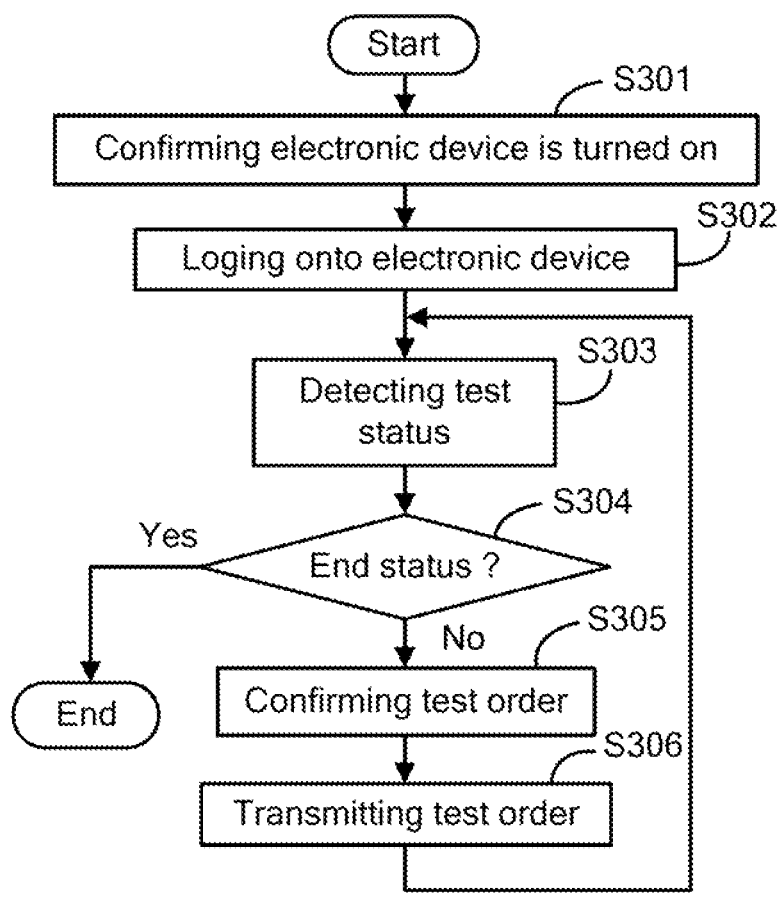
FIG. 3 is a flowchart illustrating one embodiment of a method for testing an electronic device.

FIG. 3 is a flowchart illustrating one embodiment of a method for testing an electronic device 12. Depending on the embodiment, additional blocks in the flow of FIG. 3 may be added, others removed, and the ordering of the blocks may be changed.

In block S301, the detection module 200 confirms the electronic device 12 is turned on.

In block S302, the login module 210 logs onto the electronic device 12 with the default username and the default password.

In block S303, the detection module 200 detects the test status of the electronic device 12.

In block S304, the determination module 220 determines whether the test status is the end status. If the test status is the end status, the process is complete.

If the test status is not the end status, in block S305, the determination module 220 confirms the test order based on the test status and the test order table.

In block S306, the test module 230 transmits the test order to the electronic device 12. The electronic device 12 executes the self-test based on the test order, and then block S303 is repeated.

The present disclosure provides a method for automatically testing an electronic device. Operations for testing the electronic device may be conserved.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method of a host computer for testing an electronic device, the method comprising:
confirming that the electronic device is turned on;
logging onto the electronic device;
detecting a test status of the electronic device;
transmitting a test order to the electronic device corresponding to the test status, wherein the host computer stores a test order table that indicates the test status and the test order corresponding to the test status; and executing a self-test based on the test order at the electronic device.

2. The method of claim 1, further comprising:

confirming the test order based on the test status and the test order table.

3. The method of claim 2, wherein the test status includes an initial status that indicates start of a test of the electronic device.

4. The method of claim 3, wherein the test status further includes an end status that indicates that the test has ended.

5. A host computer capable of testing an electronic device, comprising:

a storage system;

at least one processor;

one or more programs stored in the storage system and being executable by the at least one processor, the one or more programs comprising:

a detection module operable to detect whether the electronic device is turned on and detect a test status of the electronic device;

a login module operable to log onto the electronic device; and a test module operable to transmit a test order to the electronic device to have the electronic device execute a self-test based on the test order, wherein the host computer stores a test order table that indicates the test status and the test order corresponding to the test status.

6. The host computer of claim 5, further comprising a determination module operable to confirm the test order based on the test status and the test order table.

7. The host computer of claim 6, wherein the test status includes an initial status that indicates start of a test of the electronic device.

8. The host computer of claim 7, wherein the test status further includes an end status that indicates that the test has ended.

9. A storage medium having stored thereon instructions that, when executed by a processor, causing the processor to perform a method of a host computer for testing an electronic device, wherein the method comprises:

confirm that the electronic device is turned on;

log onto the electronic device;

detect a test status of the electronic device;

transmit a test order to the electronic device corresponding to the test status, wherein the host computer stores a test order table that indicates the test status and the test order corresponding to the test status; and execute a self-test based on the test order at the electronic device.

10. The storage medium of claim 9, wherein the method further comprises:

confirm the test order based on the test status and the test order table.

11. The storage medium of claim 10, wherein the test status includes an initial status that indicates start of a test of the electronic device.

12. The storage medium of claim 11, wherein the test status further includes an end status that indicates that the test has ended.

* * * * *